(No Model.)
T. F. LANGLEY.
ICE CUTTING MACHINE.
No. 474,962.  Patented May 17, 1892.
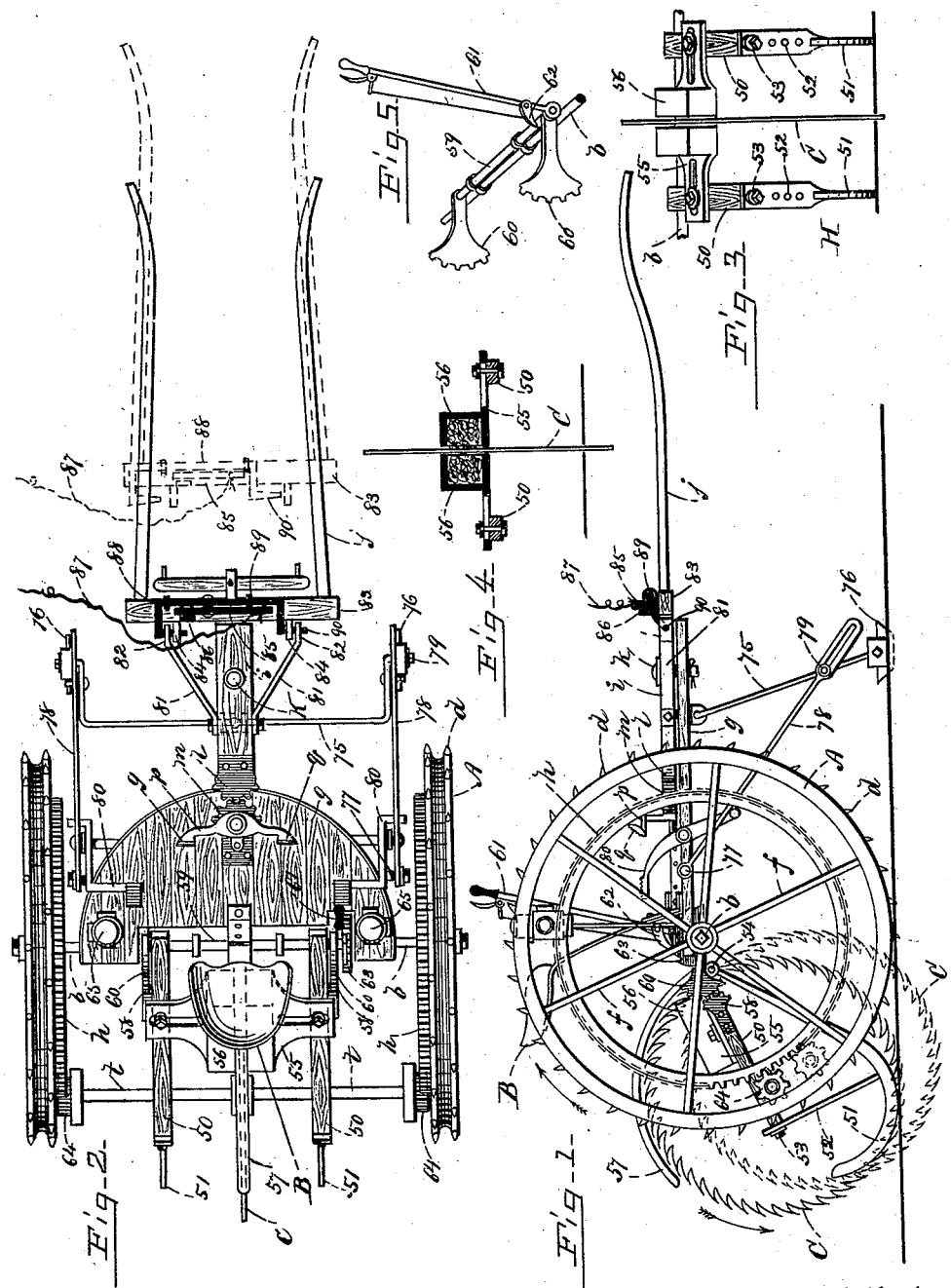

UNITED STATES PATENT OFFICE.

THOMAS F. LANGLEY, OF EAST KINGSTON, NEW HAMPSHIRE, ASSIGNOR OF ONE-FOURTH TO JAMES P. BUSFIELD, OF HAVERHILL, MASSACHUSETTS.

ICE-CUTTING MACHINE.

SPECIFICATION forming part of Letters Patent No. 474,962, dated May 17, 1892.

Application filed May 19, 1891. Serial No. 393,249. (No model.)

*To all whom it may concern:*

Be it known that I, THOMAS F. LANGLEY, of East Kingston, in the county of Rockingham, State of New Hampshire, have invented certain new and useful Improvements in Ice-Cutting Machines, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved ice-cutting machine; Fig. 2, a top plan view of the same; Fig. 3, a rear view showing the saw and sleds; Fig. 4, a sectional elevation showing saw oil-boxes, and Fig. 5 a perspective view illustrating details of construction.

Like letters and figures of reference indicate corresponding parts in the different figures of the drawings.

My invention relates especially to machines for cutting ice on ponds, &c.; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation:

In the drawings, A represents the wheels of the vehicle, which are provided with spurs $d$ on their fellies and connected by an axle $b$. A gear $h$ is secured to the inner faces of the spokes $f$. A platform-body $g$ is secured centrally to the axle, and a driver's seat B is secured centrally thereon. To the forward end of the body $g$ a pole $i$ is pivoted to swing laterally, the shafts $j$ being secured to the outer end of said pole. The pole may be extended for use when more than one horse is employed, the pivot $k$ being arranged to offset the natural swaying of the animals when at work. On the inner end of the pole a segment-gear $l$ is secured, which meshes with a gear $m$ on the body $g$. A cross-bar $p$ is mounted on the pivot of said gear $m$, and is provided with foot-plates $q$, whereby the driver may move the pole to change the line of draft and guide the machine. A sled H (see Fig. 3) comprises two arms 50, pivoted by an end on the axle $b$. Each of these bars is provided with a curved iron runner 51, pendent therefrom and adjustable vertically by means of connecting-bars 52, provided with a series of openings to receive bolts 53 in the ends of the bars 50. The upper ends of the runners are pivoted at 54 to the bar 50. Said bars 50 are connected by a slotted cross-bar 55, in which the rotary ice-saw C plays. At each side of the saw on the bar 55 a packing-box 56 is formed, containing lubricating material, which bears against the face of the saw to prevent ice from forming thereon. A curved guard-plate or dasher overlaps the top of the saw. On the outer edge of each sled-bar 50 a segmental gear 58 is secured. A rock-shaft 59 is mounted in sleeves on the axle $b$ (see Fig. 5) and bears two segment-gears 60, which respectively mesh with the sled-gears 58. The shaft 59 is moved by hand-lever 61, secured at one end thereof and projecting upward by the seat B. Said lever has a dog 62, which takes in a ratchet 63, fast on the axle $b$. A counter-shaft $t$ is journaled on the bars 50 and bears the saw C. On each end of the shaft $t$ a pinion 64 is mounted, meshing, respectively, with the wheel-gears $h$. These pinions are connected by a ratchet and pawl or suitable clutch mechanism with the saw-shaft, so that when rotating in one direction they will move said shaft and in the opposite direction will run loose thereon. Lanterns 65 are disposed on the platform $g$ in suitable positions. An angle-rod 75 is pivoted on the pole $i$ and bears at each end a guide-plate or runner 76, which is adapted to take in the ice-grooves. From a shaft 77 on the platform two rods 78 project, the outer ends of said rods being provided with slots in which pins 79 on the angle-rod 75 play. Two foot-levers 80, pivoted on the platform, have arms on which the rods 78 rest. By depressing said levers the guide-plates may be elevated out of the ice-grooves. Two brace-rods 81 are secured to opposite sides of the pole $i$ and have eyes 82 in their outer ends. To these rods shafts $j$ are detachably secured when the vehicle is drawn by a single animal. The whiffletree-bar 83 has eyes 84, adapted to register with the brace-rod eyes 82. A lever 85 is pivoted eccentrically at 86 to swing vertically on said bar. To the free end of said lever a line 87 is attached for use by the driver in elevating said lever. An angle-iron 88 is pivoted at 89 on said lever and has arms 90, adapted to enter the eyes 82 84 and lock the shafts to the brace-rods 81 when said lever is depressed. By elevating the lever the angle-iron may be at once withdrawn from the brace-eyes, freeing the shafts from the body of the vehicle, should either the horse or the cutter break through the ice, the parts in this case assuming the position shown by dotted lines in Fig. 2.

In the use of my improvement, the machine being in motion, the guide-plates 76 are disposed in the ice-grooves last formed, so that the groove or kerf formed by the cutter-wheel or saw C shall be parallel therewith and the ice-blocks cut or marked of equal size. The operator is readily enabled to thus direct the guide-wheels by means of the lever $p$, whereby the direction of the draft may be changed, as specified. Said plates may be elevated, as desired, out of contact with the ice by the foot-lever 80. The saw C may be employed in marking or grooving the ice or in cutting the same into cakes. The rotation of the wheels imparts speed and power directly to the saw by means of the counter-shaft and pinions. The saw or frame-bar may be weighted to cut to any depth, and said saw may be elevated and sustained out of contact with the ice by means of the handle-lever 61 and pawl 62 and ratchet 63 in a manner readily understood without a more explicit description. The segment-gears connecting the body of the vehicle with the saw frame or sled permits the same to be adjusted by means of the lever 61 with very little expenditure of power. The sled being pivoted on the axle, while supporting the saw permits the same to feed freely. By mounting the pinions on the counter-shaft by means of clutches when the vehicle is "backed" said pinions will run loose thereon, preventing them from unmeshing with the wheel-gears.

Having thus explained my invention, what I claim is—

1. In an ice cutting or grooving machine, a body having wheels provided with gears, in combination with a rotary saw mounted on a shaft in a frame pivoted to the axle and having its journals geared to said wheels, segments on said frame, a rock-shaft having segments engaging with those on the frame, and a lever for oscillating said shaft, substantially as described.

2. In an ice cutting or grooving machine, the combination of a body mounted on wheels, a rotary saw carried by said body, a horizontally-pivoted pole provided with a segment-gear, and a foot-lever pivoted on said body and provided with a gear meshing with the pole-gear, substantially as described.

3. In an ice cutting or grooving machine, the body, combined with a rod pivoted to swing vertically thereon, guide-plates on said rod, a lifting-rod pivoted to the body at an angle to the other rod and having a slot loosely engaging a pin on said rod, and a foot-lever pivoted to said body and supporting said lifting-rod, substantially as and for the purpose set forth.

4. In an ice cutting or grooving machine, the body, in combination with a horizontally-swinging pole, means for turning it, a vertically-pivoted rod provided with guide-plates, and a foot-lever pivoted to said body for lifting said rod, substantially as and for the purpose set forth.

5. In a device of the character described, a body mounted on spurred wheels provided with gears, combined with a rotary saw mounted in a sled pivoted to swing vertically on the axle and a counter-shaft in the sled provided with pinions meshing with the wheel-gears, said pinions being mounted on said shaft, substantially as described.

6. In an ice-cutting machine, the vehicle-body mounted on wheels A, provided with gears $h$, in combination with the arms 50, the runners 51, pivoted at their upper ends thereto, the extension-bars 52, adjustably connecting said runners and arms, the counter-shaft journaled in said arms and provided with pinions 64, meshing with said gears, the saw on said shaft, and lever-actuated mechanism for elevating said arms, substantially as described.

7. In an ice-cutting machine, the vehicle-body mounted on wheels A, in combination with the sled-arms 50, the runners 51, pivoted at their upper ends thereto, the extension-bars 52, adjustably connecting said runners and arms, the saw carried by said arms, and lever-actuated mechanism for elevating them, substantially as described.

8. In an ice-cutting machine, stuffing-boxes mounted on the saw-frame, and a lubricator in said boxes engaging the faces of the saw, substantially as described.

9. The sled H, provided with the slotted brace 55, having stuffing-boxes 56, in combination with the rotary saw working between said boxes.

THOMAS F. LANGLEY.

Witnesses:
JOHN G. W. ROWELLE,
THOMAS LANGLEY.